(12) United States Patent
Makino et al.

(10) Patent No.: US 11,719,320 B2
(45) Date of Patent: Aug. 8, 2023

(54) DRIVING DEVICE AND ASSEMBLING METHOD FOR DRIVING DEVICE

(71) Applicant: Seiko Epson Corporation, Tokyo (JP)

(72) Inventors: Hiroshi Makino, Chino (JP); Taketo Honzawa, Tomi (JP)

(73) Assignee: SEIKO EPSON CORPORATION

(*) Notice: Subject to any disclaimer, the term of this patent is extended or adjusted under 35 U.S.C. 154(b) by 0 days.

(21) Appl. No.: 17/454,260

(22) Filed: Nov. 10, 2021

(65) Prior Publication Data
US 2022/0145976 A1    May 12, 2022

(51) Int. Cl.
*F16H 49/00* (2006.01)
*B25J 9/10* (2006.01)

(52) U.S. Cl.
CPC .......... *F16H 49/001* (2013.01); *B25J 9/1025* (2013.01)

(58) Field of Classification Search
CPC .................................................. F16H 49/001
USPC ......................................................... 74/640
See application file for complete search history.

(56) References Cited

U.S. PATENT DOCUMENTS

| | | | | |
|---|---|---|---|---|
| 4,637,776 A | * | 1/1987 | Saito | B25J 9/1005 414/744.5 |
| 5,497,041 A | * | 3/1996 | Kondoh | H02K 3/26 310/82 |
| 10,876,614 B2 | * | 12/2020 | Mendel | F16C 33/581 |
| 11,118,669 B2 | * | 9/2021 | Shirokoshi | F16H 57/04 |
| 2014/0047938 A1 | * | 2/2014 | Horiuchi | F16C 19/362 74/412 R |
| 2015/0285357 A1 | * | 10/2015 | Orii | F16H 57/0404 74/640 |
| 2020/0232549 A1 | * | 7/2020 | Shirokoshi | F16H 1/32 |

FOREIGN PATENT DOCUMENTS

| | | |
|---|---|---|
| JP | S60-057058 A | 4/1985 |
| JP | H10-019133 A | 1/1998 |

* cited by examiner

*Primary Examiner* — Ha Dinh Ho
(74) *Attorney, Agent, or Firm* — Harness, Dickey & Pierce, P.L.C.

(57) ABSTRACT

A driving device includes a motor, a wave gear device including a wave generator having first thickness, a flex spline, and a circular spline having thickness larger than the first thickness, a housing functioning as a housing of the motor and including a flange, and an oil seal fixed to the inner side of the flange and extending along the outer circumference of the shaft. The wave generator is set closer to the opposite direction of the flange to configure an internal space with the members. When the internal space is filled with grease, a distance between the oil seal and the wave generator is set smaller than distances among the other members.

4 Claims, 7 Drawing Sheets

DRIVING DEVICE AND ASSEMBLING METHOD FOR DRIVING DEVICE

The present application is based on, and claims priority from JP Application Serial Number 2020-188054, filed Nov. 11, 2020, the disclosure of which is hereby incorporated by reference herein in its entirety.

BACKGROUND

1. Technical Field

The present disclosure relates to a driving device and an assembling method for the driving device.

2. Related Art

In assembling of an industrial robot including work such as assembling of a motor and a speed reducer to an arm, a commercially available servomotor including a housing and a commercially available speed reducer are assembled into a driving device by joining a plurality of intervening members. As a method of sealing grease of the speed reducer, in a related art of an oil seal protection device of a rotary machine described in JP-A-10-19133 (Patent Literature 1), an oil seal is provided in a shaft to prevent the grease inside the speed reducer from intruding into the inside of a motor.

When assembling an arm, a speed reducer, a motor, and the like while joining a plurality of intervening members, it is necessary to inject grease that performs a lubricating function. In that case, there is a concern about intrusion of the grease into the motor.

SUMMARY

A driving device includes: a motor including a shaft; a wave gear device including a wave generator having first thickness in an axial direction of the shaft, a flex spline configured to be flexurally deformed along an outer circumference of the wave generator, and a circular spline configured to interlock with rotation of the wave generator via the flex spline and having thickness larger than the first thickness in the axial direction of the shaft; at least one intervening member functioning as a housing of the motor and including a flange for fixing a part of the circular spline; and an oil seal fixed to an inner side of the flange and extending along an outer circumference of the shaft. When viewed from a perpendicular direction with respect to an axis of the shaft in a cross section including the axis, the wave generator is set closer to an opposite direction of the flange to configure an internal space with the shaft, the wave generator fixed to the shaft, the flex spline, the circular spline, the flange, and the oil seal, and the internal space is filled with grease and, then, a distance between the oil seal and the wave generator is set smaller than distances among the other members in the axial direction of the shaft.

An assembling method for a driving device includes, halfway in an assembling step for assembling a motor including a shaft, a wave gear device including a wave generator, at least one intervening member functioning as a housing of the motor and including a flange for fixing a part of the wave gear device, and an oil seal extending along an outer circumference of the shaft, filling grease in an internal space configured by the shaft, the wave gear device, the flange, and the oil seal. After an end of the assembling step, in the internal space, a distance between the oil seal and the wave generator is smaller than distances among the other members in an axial direction of the shaft.

DESCRIPTION OF EXEMPLARY EMBODIMENTS

1. Embodiment

A robot 10 including a driving device 100 according to an embodiment is explained.

The robot 10 in this embodiment can perform work such as supply, removal, conveyance, and assembly of a precision instrument and components configuring the precision instrument.

Figure 1:
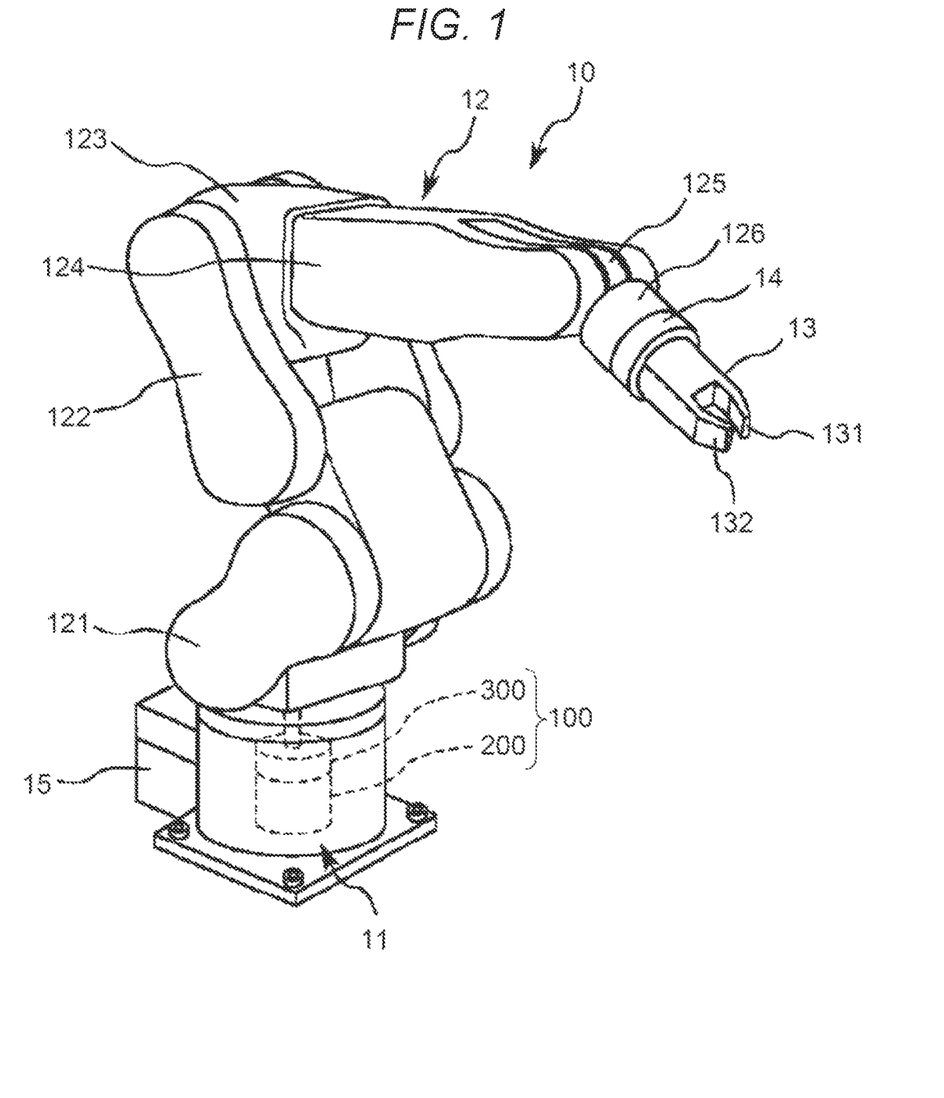
FIG. 1 is a perspective view showing a schematic configuration of a robot including a driving device according to an embodiment.

FIG. 1 is a perspective view showing a schematic configuration of the robot 10 including the driving device 100 according to this embodiment.

As shown in FIG. 1, the robot 10 is, for example, a six-axis vertical articulated robot and includes a base 11, a robot arm 12 coupled to the base 11, and a detector 14 and a hand 13 provided at the distal end portion of the robot arm 12. The robot 10 includes a plurality of driving devices 100 that generate power for driving the robot arm 12 and a control device 15 that controls the plurality of driving devices 100.

The base 11 is a portion for attaching the robot 10 to any setting place. A setting place of the base 11 is not particularly limited. Examples of the setting place include a floor, a wall, a ceiling, and a movable truck.

The robot arm 12 includes a plurality of arms (a first arm 121, a second arm 122, a third arm 123, a fourth arm 124, a fifth arm 125, and a sixth arm 126), which are coupled in this order from the proximal end side toward the distal end side of the robot arm 12. The first arm 121 is coupled to the base 11.

The driving device 100 transmits a driving force from the base 11 to the first arm 121 and turns the first arm 121 with respect to the base 11. The hand 13 (an end effector) that grips, for example, various components is detachably attached to the distal end of the sixth arm 126. The hand 13 includes two fingers 131 and 132 and can grip, for example, various components with the fingers 131 and 132.

The driving device 100 is provided in the base 11. The driving device 100 includes a motor 200 such as a servomotor that drives the first arm 121 and a wave gear device 300 (a deceleration device). Although not shown in FIG. 1, a plurality of driving devices including motors and deceleration devices are respectively provided in the arms 121 to 126 as well. Each of the driving devices is controlled by the control device 15.

In such a robot 10, the wave gear device 300 transmits a driving force from one to the other of the base and the first arm 121. Specifically, the wave gear device 300 transmits, from the base 11 side to the first arm 121 side, a driving force for turning the first arm 121 with respect to the base 11. The wave gear device 300 functions as the deceleration device to thereby decelerate rotation of the motor 200, improve the driving force, and turn the first arm 121 with respect to the base 11.

Figure 2:
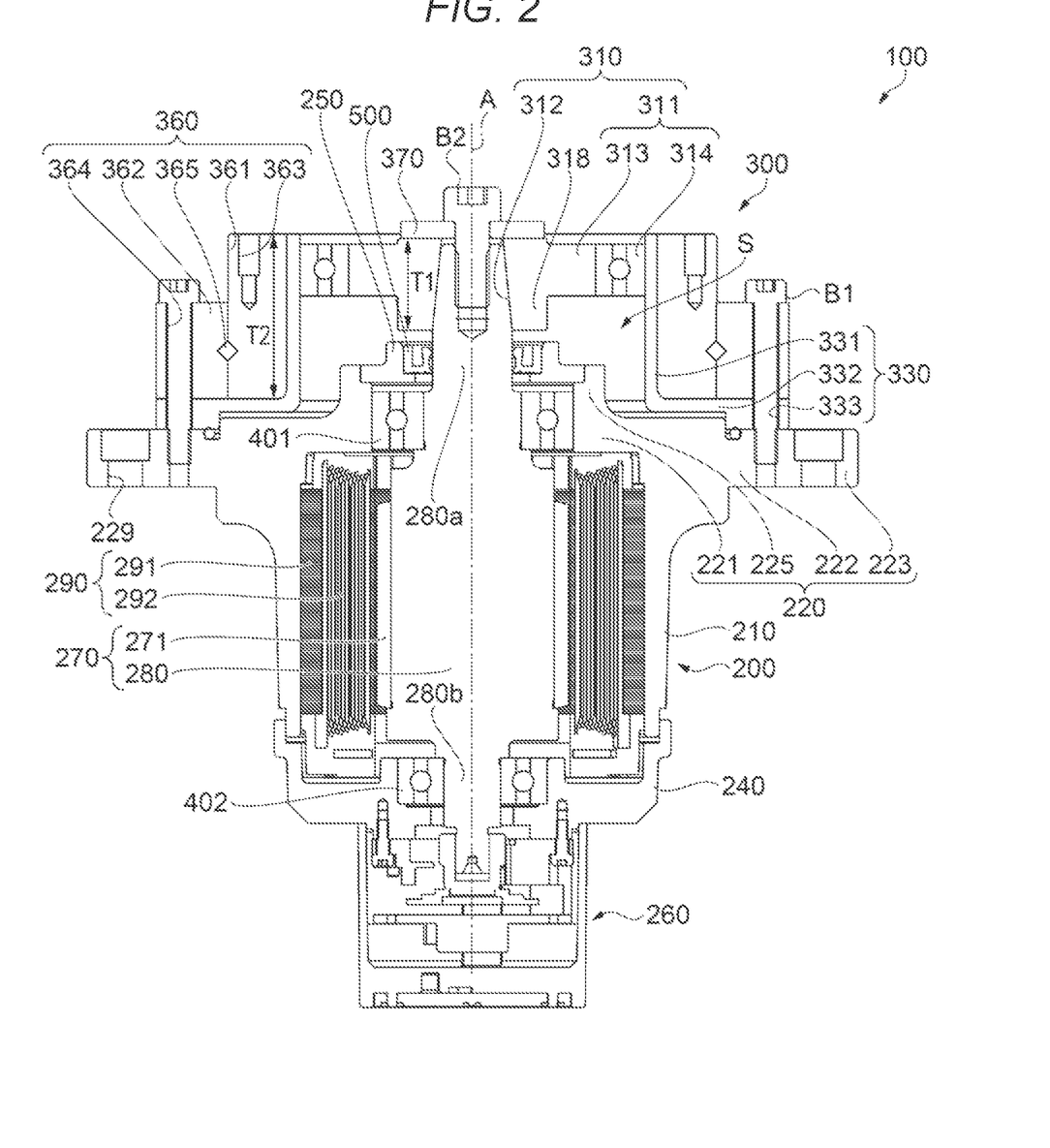
FIG. 2 is a sectional view showing a schematic configuration of the driving device according to the embodiment.
Figure 3:
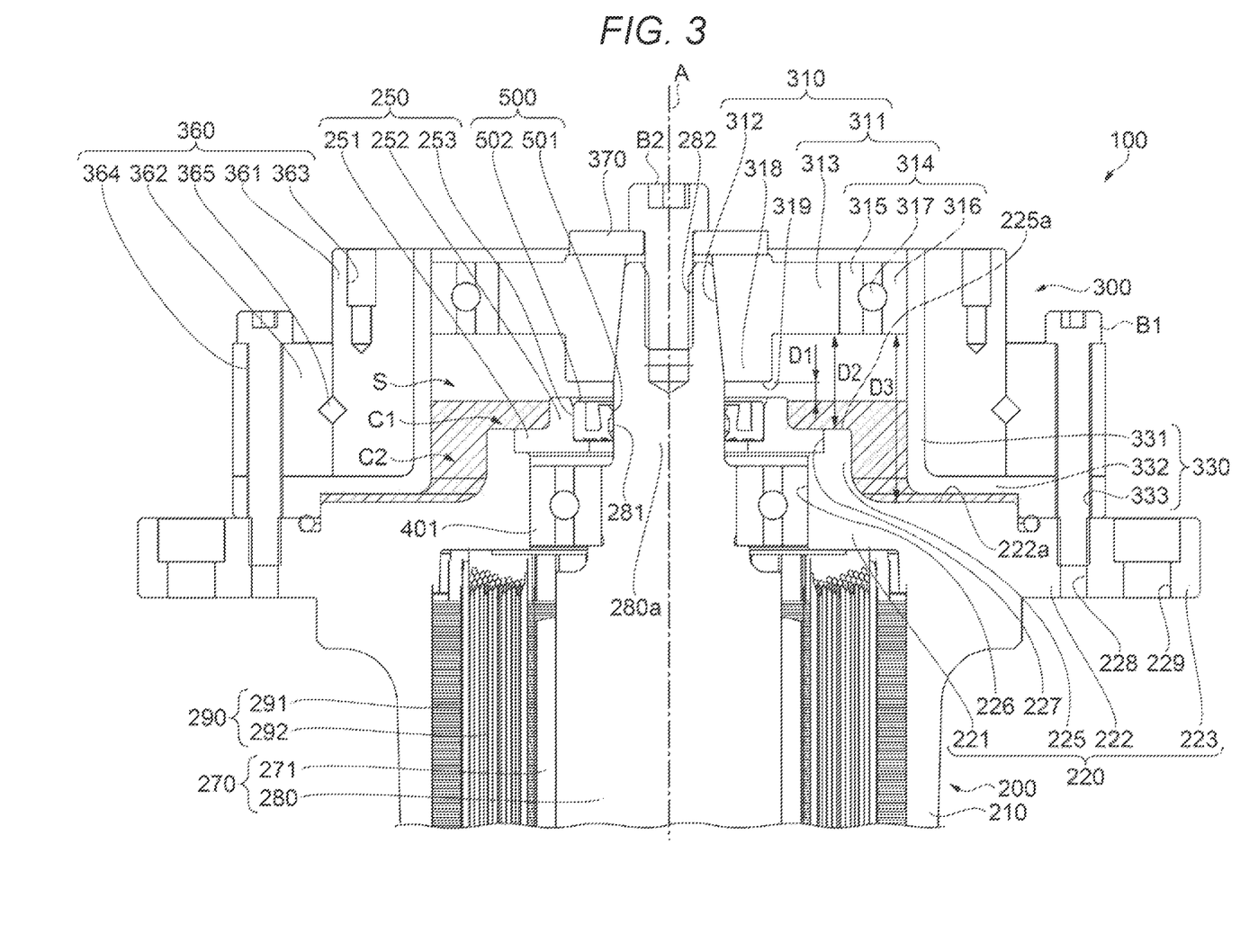
FIG. 3 is an enlarged view showing a main part of the driving device according to the embodiment.

FIG. 2 is a sectional view showing a schematic configuration of the driving device 100 according to this embodiment. FIG. 2 is a sectional view centering on a center axis A of a shaft 280. FIG. 3 is an enlarged view showing a main part of the driving device 100 according to this embodiment.

The driving device 100 is explained with reference to FIGS. 2 and 3.

In FIG. 2 and subsequent figures, for convenience of explanation, in a drawing view, an upper side of the drawings is represented as an upper side, an upward direction, and an upper part and a lower side of the drawings is represented as a lower side, a downward direction, and a lower part.

The driving device 100 in this embodiment includes, as explained above, the motor 200 and the wave gear device 300 (the deceleration device).

The motor 200 according to this embodiment is explained.

As the motor 200 in this embodiment, a so-called servomotor is used. Specifically, an AC servomotor is used. The motor 200 is not particularly limited. Examples of the motor 200 include a DC servomotor and a stepping motor. The motor 200 includes, as shown in FIG. 2, a rotor 270, a stator 290, and a housing 210 functioning as at least one intervening member. The housing 210 functions as a housing of the motor 200 in conjunction with a case 240 explained below.

As shown in FIG. 2, bearings 401 and 402 are set at the upper side end portion of the housing 210 and in the center of the case 240 on the lower side of the housing 210. A flange 220 is formed at the upper side end portion of the housing 210. An axis of the shaft 280 is the same as the center axis A, which is a center of rotation.

The bearings 401 and 402 are roller bearings including inner rings and outer rings. Both end portions of the shaft 280 are respectively fixed to the inner rings of the bearings 401 and 402 by interference fit. The outer ring of one bearing 401 is supported by a motor supporting section 221 of the housing 210 (the flange 220) explained below. The outer ring of the other bearing 402 is supported by the case 240. The case 240 is fixed to the housing 210.

The shaft 280 of the motor 200 is supported by the housing 210 and the case 240 via the bearings 401 and 402 and rotates around the center axis A. The shaft 280 is coupled to the wave gear device 300 at an end portion 280a on the bearing 401 side and transmits a driving force to the wave gear device 300. The shaft 280 is coupled to, at an end portion 280b on the bearing 402 side, a rotation detector 260 that detects rotation of the shaft 280.

The motor 200 is further explained.

The rotor 270 includes the shaft 280 functioning as a rotating shaft and a magnet 271. The shaft 280 is formed along the direction of the center axis A in a columnar shape reduced in diameter. The shaft 280 is made of a soft magnetic material such as iron. The shaft 280 is supported to be rotatable around the center axis A via the bearings 401 and 402.

The magnet 271 is fixed to the outer circumferential surface along the center axis A of the shaft 280. The magnet 271 is formed in an annular shape. A plurality of magnets 271 are disposed side by side in the circumferential direction. The magnet 271 has a multipole structure in which a plurality of magnetic poles are formed in the circumferential direction. The magnet 271 is configured by, for example, six magnet pieces, polarities of which are NSNSNS in the circumferential direction. The magnet 271 is surrounded by the stator 290.

The stator 290 surrounds the rotor 270 around the center axis A. The stator 290 is formed in a cylindrical shape and includes a coil 292 around iron cores 291 disposed at a predetermined interval in the circumferential direction and respectively functioning as cores.

When an alternating current is fed to the stator 290 of the motor 200 configured as explained above, the stator 290 changes to an electromagnet. The direction and the magnitude of the electric current are alternately switched because the electric current is the alternating current, whereby the stator 290 is switched to the N pole and the S pole. According to the switching of the stator 290, the rotor 270 attracts and repels the magnet 271, whereby the rotor 270 (the shaft 280) rotates.

The housing 210 according to this embodiment is explained.

As shown in FIG. 2, the wave gear device (the deceleration device) 300 is set on the upper side of the motor 200. The flange 220 is formed in the housing 210. The flange 220 is formed to extend in a substantial disk shape in a perpendicular direction (a radial direction) with respect to the center axis A at the upper side end portion of the housing 210.

The flange 220 includes a motor supporting section 221 that supports the motor 200, a deceleration-device supporting section 222 that supports the wave gear device 300, and a base attaching section 223 attached to a housing of the base 11. The motor supporting section 221, the deceleration-device supporting section 222, and the base attaching section 223 are integrally configured as one component.

In this embodiment, since the motor supporting section 221, the deceleration-device supporting section 222, and the base attaching section 223 are integrally configured by one component as the flange 220 (the housing 210), the driving device 100 can be directly fixed to the base 11 not via another component. Screw holes for fixing 229 for fixing the driving device 100 to the base 11 are formed in the base attaching section 223.

As shown in FIGS. 2 and 3, in the motor supporting section 221 in the center of the flange 220 centering on the center axis A, a substantially cylindrical protrusion section for fixing 225 is formed. The protrusion section for fixing 225 includes an opening for inserting through the shaft 280 and setting the bearing 401 and an oil-seal fixing member 250 on an inner circumferential surface and is formed to project in the upward direction. The oil-seal fixing member 250 is a member for fixing an oil seal 500 explained below.

As shown in FIG. 3, the bearing 401 that rotatably axially support the shaft 280 is set on an inner circumferential surface 226 of the protrusion section for fixing 225. An inner circumferential surface 227, on which the oil-seal fixing member 250 is set, is formed on the upper side of the inner circumferential surface 226. In this embodiment, the oil-seal fixing member 250 is closely welded to the inner circumferential surface 227 without a gap and is integrated with the motor supporting section 221.

In this embodiment, the housing 210 including the flange 220 and the oil-seal fixing member 250 are made of aluminum of a metal member. The housing 210 including the flange 220 is configured by integral molding of aluminum. The case 240 is also configured by the integral molding of aluminum.

As shown in FIG. 3, the oil-seal fixing member 250 includes, in the center, an opening for inserting through the end portion 280a of the shaft 280 and is formed in an annular shape. The oil-seal fixing member 250 includes a main body section 251 welded to the inner circumferential surface 227 of the protrusion section for fixing 225, a wall section 252 to which the outer circumference side of the oil seal 500 is fixed, and a recess 253 formed from the wall section 252 to the opening.

The oil seal 500 is set in the recess 253, whereby the oil-seal fixing member 250 annularly surrounds the oil seal 500. Since the oil seal 500 is set in the recess 253 of the oil-seal fixing member 250, a lip surface 501 of the oil seal 500 adheres to an outer circumferential surface 281 of the shaft 280. The shaft 280 slides on the lip surface 501 and rotates.

The wave gear device 300 according to this embodiment is explained.

The wave gear device 300 in this embodiment is a deceleration device. The wave gear device 300 decelerates, at a high reduction ratio, rotation of a driving force input by the shaft 280 and outputs the rotation. On the output side, it is possible to obtain high torque proportional to the reduction ratio. As shown in FIGS. 2 and 3, the wave gear device 300 includes a wave generator 310, a flex spline 330, and a circular spline 360.

The circular spline 360 is a gear configured by a rigid body that substantially does not bend in the radial direction of the center axis A and is an annular internal gear including internal teeth (not shown). The circular spline 360 interlocks with rotation of the wave generator 310 via the flex spline 330.

The annular circular spline 360 is configured by two parts, that is, a coupling section 361 that couples the circular spline 360 to an arm (in FIG. 1, the first arm 121) of the robot 10 and a fixing section 362 that fixes the circular spline 360 to the deceleration-device supporting section 222 of the flange 220. The circular spline 360 has, in the center axis A direction of the shaft 280, thickness T2 (FIG. 2) larger than first thickness T1 (FIG. 2) of a main body section 313 including a projecting section 318 of the wave generator 310 explained below.

The coupling section 361 includes the inner teeth (not shown) on the radial direction inner side of the center axis A at the upper side end portion of the coupling section 361. Screw holes for fixing 363 for coupling the circular spline 360 to the first arm 121 are formed in the coupling section 361. The fixing section 362 includes through-holes 364 for fixing the circular spline 360 to the deceleration-device supporting section 222 of the flange 220.

The coupling section 361 and the fixing section 362 are coupled by a bearing 365. The coupling section 361 is configured to be rotatable with respect to the fixing section 362. The bearing 365 is a so-called cross roller bearing and is a bearing in which rollers are alternately disposed at angles of +45° and −45° with respect to a rotation axis to be able to receive both radial and thrust loads.

The flex spline 330 is inserted through the inner side of the circular spline 360. The flex spline 330 is a gear including, in the radial direction of the center axis A, a tubular section 331 having flexibility flexurally deformable along the outer circumference of the wave generator 310 and is an external gear including external teeth (not shown) that mesh with the internal teeth of the circular spline 360. The external teeth are formed on the radial direction outer side of the center axis A at the upper side end portion of the tubular section 331. The number of teeth of the flex spline 330 is smaller than the number of teeth of the circular spline 360.

The flex spline 330 includes, in addition to the tubular section 331, a brim section 332 extending from the lower side end portion of the tubular section 331 to the radial direction outer side of the center axis A. The brim section 332 is disposed between the annular circular spline 360 (the coupling section 361 and the fixing section 362) and the deceleration-device supporting section 222 of the flange 220.

The brim section 332 includes though-holes 333 opposed to the through-holes 364 of the fixing section 362 of the circular spline 360. When the fixing section 362 of the circular spline 360 and the brim section 332 of the flex spline 330 are fixed to the deceleration-device supporting section 222, bolts B1 are inserted through the through-holes 364 of the fixing section 362 of the circular spline 360 and the through-holes 333 of the brim section 332 of the flex spline 330 and screwed in the screw holes for fixing 228 formed in the deceleration-device supporting section 222.

The wave generator 310 includes a wave-motion generating section 311 and the projecting section 318. A through-hole 312, through which the end portion 280a of the shaft 280 is inserted, is formed in a rotation center of the wave-motion generating section 311. The end portion 280a of the shaft 280 is columnar and is formed to be reduced in diameter toward the distal end side. The through-hole 312 is formed along the outer circumferential surface of the end portion 280a formed to be reduced in diameter.

When viewed from the center axis A direction at the circumferential edge on the motor 200 side (the lower side) of the through-hole 312, the projecting section 318 has a distance in the radial direction covering the oil seal 500. When viewed from the perpendicular direction with respect to the center axis A, the projecting section 318 is formed to annularly project toward the oil seal 500.

A screw hole for fixing 282 formed along the center axis A is formed at the distal end portion of the end portion 280a of the shaft 280. The end portion 280a of the shaft 280 is inserted through the through-hole 312 and a bolt B2 is inserted into and screwed in, via a stop ring 370, the screw hole for fixing 282 of the shaft 280, whereby the wave generator 310 is fixed to the distal end portion of the shaft 280. Consequently, the wave generator 310 interlocks with rotation of the shaft 280 and rotates.

The wave-motion generator 311 includes a main body section 313 and a bearing 314 attached to the outer circumference of the main body section 313. The through-hole 312 is formed in the main body section 313. When viewed from the center axis A direction, the outer circumference of the main body section 313 is formed in an elliptical shape or an oval shape.

As shown in FIG. 3, the bearing 314 is a roller bearing including an inner ring 315, an outer ring 316, and a plurality of balls 317 disposed between the inner ring 315 and the outer ring 316. The inner ring 315 is fixed in the outer circumference of the main body section 313 and is elastically deformed into an elliptical shape or an oval shape along the outer circumferential surface of the main body section 313. According to the elastic deformation of the inner ring 315, the outer ring 316 is also elastically deformed into an elliptical shape or an oval shape.

The outer circumferential surface of the inner ring 315 and the inner circumferential surface of the outer ring 316 are respectively track surfaces for rolling the plurality of balls 317 while guiding the plurality of balls 317 along the circumferential direction. The plurality of balls 317 are held by a not-shown holder to keep an interval in the circumferential direction of the plurality of balls 317 constant.

When the wave generator 310 is fixed to the shaft 280, the wave generator 310 is inserted through the inner side of the flex spline 330. When viewed from the perpendicular direction with respect to the direction of the center axis A in a cross section including the center axis A serving as the axis of the shaft 280, the wave generator 310 is set closer to the opposite direction of the flange 220. The wave generator 310 is capable of rotating around the center axis A by being fixed to the shaft 280.

The wave-motion generating section 311 comes into contact with the inner circumferential surface of the tubular section 331 of the flex spline 330, bends (elastically deforms) the tubular section 331 into an elliptical shape or an oval shape, and partially meshes the external teeth of the tubular section 331 with the internal teeth of the circular spline 360 (the coupling section 361). In general, when the flex spline 330 is bent into an elliptical shape by the wave generator 310, the circular spline 360 and the teeth mesh with each other in the portion of the major axis of the elliptical shape and the teeth are completely separated in the portion of the minor axis. Consequently, the flex spline 330 and the circular spline 360 are meshed with each other on the inside and the outside to be capable of rotating around the center axis A.

In the driving device 100 configured in this way, when a driving force from the motor 200 is input to the wave generator 310, the flex spline 330 and the circular spline 360 relatively rotate around the center axis A because of the difference in the number of teeth while a meshing position of the flex spline 330 and the circular spline 360 sequentially moves in the circumferential direction.

In this embodiment, the brim section 332 of the flex spline 330 and the fixing section 362 of the circular spline 360 are fixed to the flange 220 (the deceleration-device supporting section 222). Accordingly, the coupling section 361 of the circular spline 360 meshes with the flex spline 330, whereby the coupling section 361 relatively rotates around the center axis A.

Consequently, rotation of the driving force input to the wave generator 310 from the shaft 280 of the motor 200, which is a driving source, is decelerated and output from the circular spline 360 (the coupling section 361). On the output side, torque proportional to a reduction ratio can be obtained. That is, it is possible to realize the wave gear device 300 functioning as a deceleration device including the wave generator 310 on the input side and including the circular spline 360 (the coupling section 361) on the output side.

FIGS. 4A to 4D are diagrams showing an assembling method for the driving device 100 in this embodiment. An example of the assembling method (an assembling process) for the driving device 100 is explained with reference to FIGS. 4A to 4D. However, in FIGS. 4A to 4D, only a main part of the motor 200 is shown. Explanation about the assembling method for the motor 200 is omitted. The order of assembling of the driving device 100 is not limited to order explained below. A method of joining and the like is not limited to one.

Figure 4A:
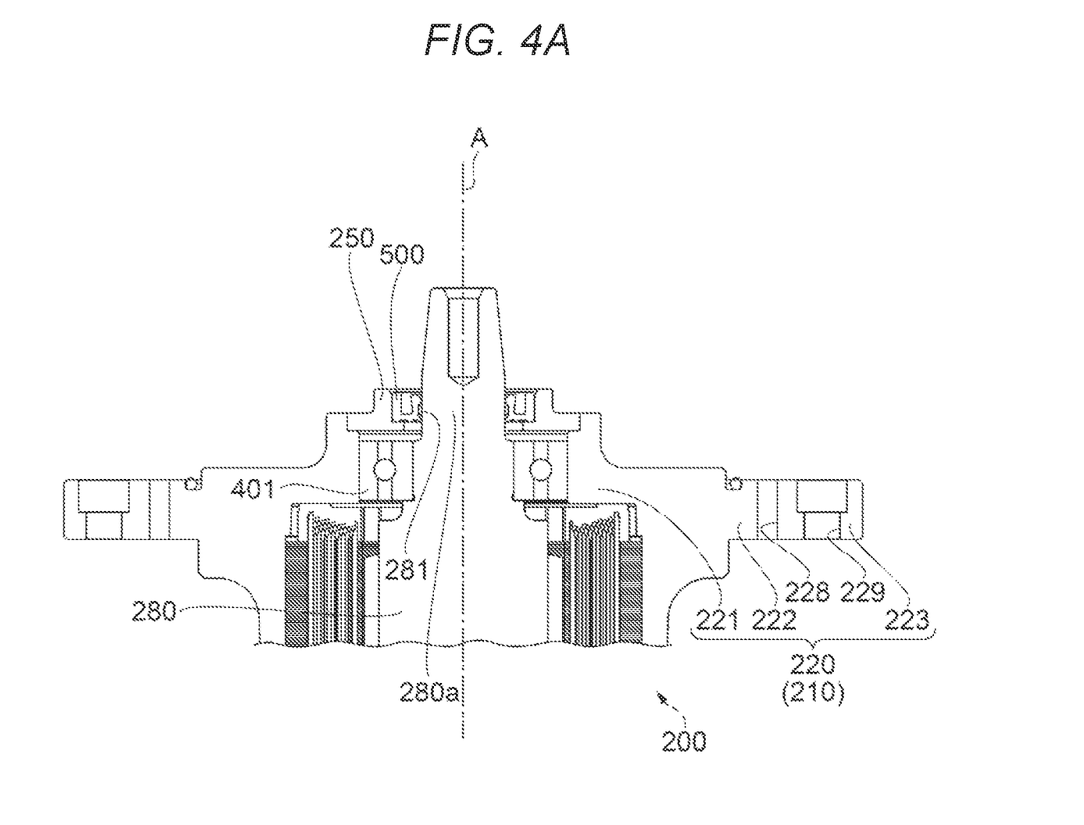
FIG. 4A is a diagram showing an assembling method for the driving device according to the embodiment.

As shown in FIG. 4A, as a premise, the motor 200 is rotatably assembled on the inside of the housing 210 and the case 240 (FIG. 2) and the oil-seal fixing member 250 is fixed (joined) to the housing 210, the oil seal 500 is incorporated in the oil-seal fixing member 250, and the lip surface 501 (FIG. 3) of the oil seal 500 adheres to the outer circumferential surface 281 of the shaft 280.

The assembling process in this embodiment includes a flex spline/circular spline attaching step, a grease injecting step, and a wave generator attaching step.

Figure 4B:
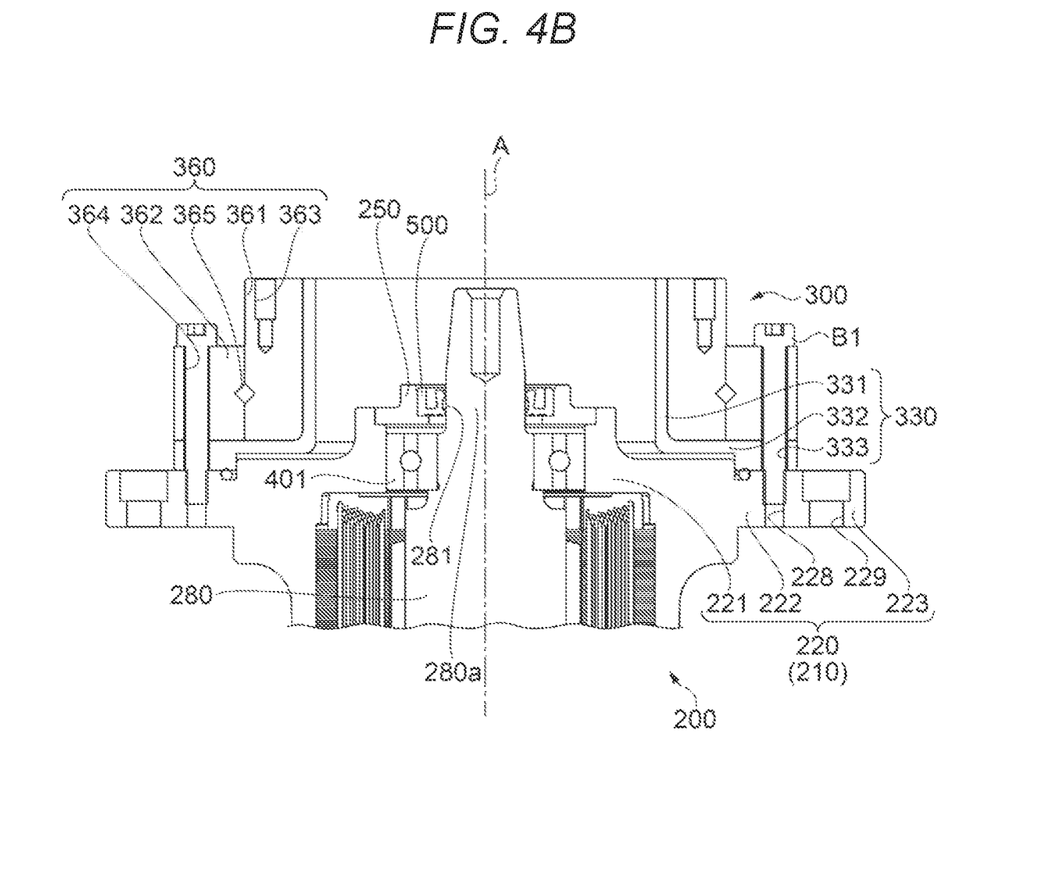
FIG. 4B is a diagram showing the assembling method for the driving device according to the embodiment.

As shown in FIG. 4B, the flex spline 330 and the circular spline 360 are assembled to the flange 220 (the deceleration-device supporting section 222) of the housing 210. Specifically, the though-holes 333 of the brim section 332 of the flex spline 330 are aligned with the screw holes for fixing 228 of the deceleration-device supporting section 222. The circular spline 360 is placed on an upper part of the brim section 332 and the through-holes 364 of the fixing section 362 are aligned with the through-holes 333 of the brim section 332. Thereafter, the bolts B1 are inserted through the through-holes 364 and 333 from the upward direction and screwed in the screw holes for fixing 228. Consequently, the flex spline 330 and the circular spline 360 are assembled to the flange 220 (the deceleration-device supporting section 222) of the housing 210.

This step is the flex spline/circular spline attaching step.

In this embodiment, in the flex spline/circular spline attaching step, the flex spline 330 and the circular spline 360 are separately attached. However, the flex spline 330 and the circular spline 360 may be sub-assembled first. In that case, it is unnecessary to align the flex spline 330 and the circular spline 360. The through-holes 364 and 333 may be aligned with the screw holes for fixing 228 of the deceleration-device supporting section 222 in the sub-assembled state and, thereafter, the bolts B1 may be inserted through the through-holes 364 and 333 from the upward direction and screwed in the screw holes for fixing 228.

Figure 4C:
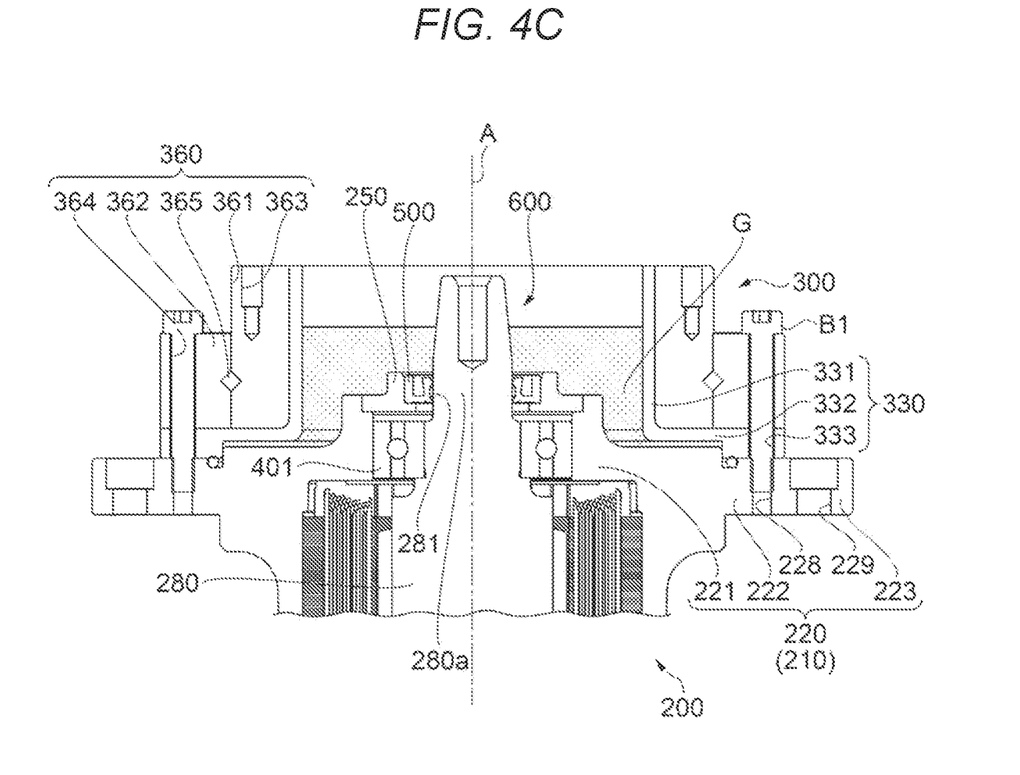
FIG. 4C is a diagram showing the assembling method for the driving device according to the embodiment.

Subsequently, as shown in FIG. 4C, grease G is injected into a groove section 600 surrounded by the flex spline 330, the flange 220, the oil-seal fixing member 250, the oil seal 500, and the end portion 280a of the shaft 280. The oil seal 500 is fixed to the oil-seal fixing member 250. The lip surface 501 of the oil seal 500 is caused to adhere to the outer circumferential surface 281 of the shaft 280 to prevent the grease G from intruding into the inside of the motor 200 via the bearing 401.

This step is the grease injecting step into the groove section 600.

The shaft 280 causes the lip surface 501 of the oil seal 500 to adhere to the outer circumferential surface 281 of the shaft 280 and slides on the lip surface 501 and rotates. In this case, when the life of the oil seal 500 is considered, it is necessary to interpose the grease G on the lip surface 501 and use the oil seal 500 in a lubricated state. The grease G circulates while forming a thin liquid film in fine unevenness present on the lip surface 501 and the outer circumferential surface 281. However, the grease G slightly oozing out in a leaking direction is pushed back by a pump effect caused by the influence of the rotation of the shaft 280. Therefore, the grease G is prevented from leaking to the bearing 401 side.

Figure 4D:
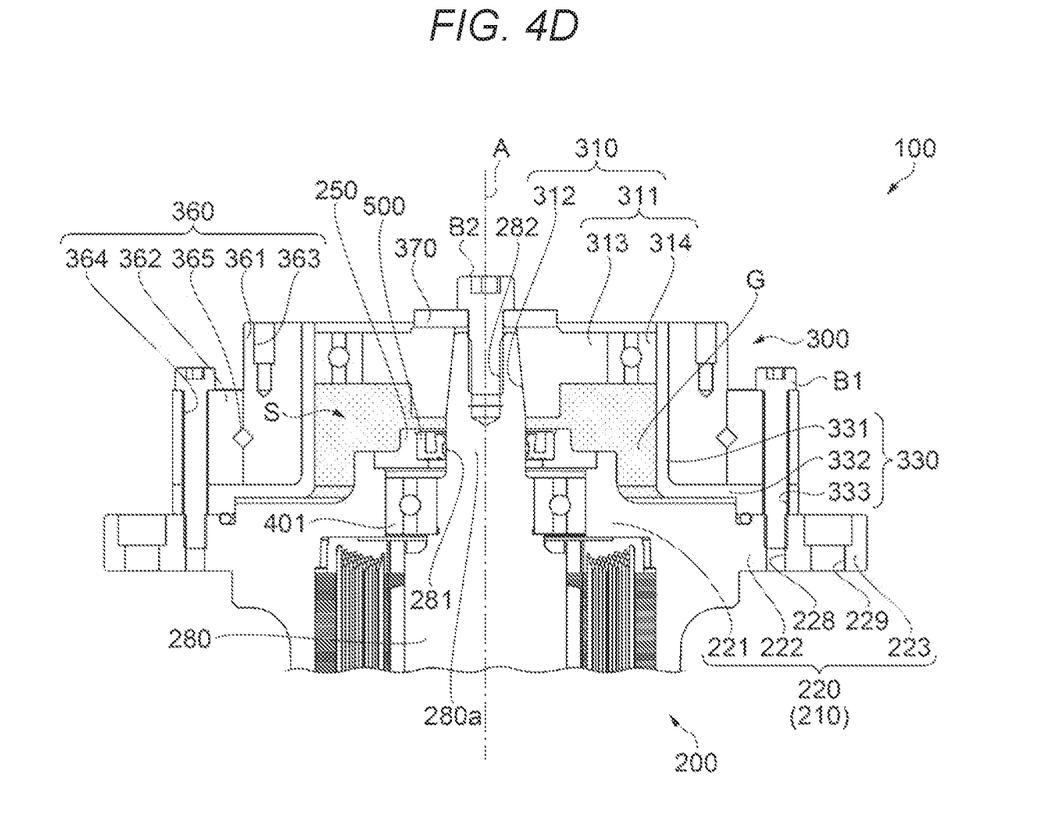
FIG. 4D is a diagram showing the assembling method for the driving device according to the embodiment.

Subsequently, as shown in FIG. 4D, the wave generator 310 is assembled to the end portion 280a of the shaft 280. Specifically, the end portion 280a of the shaft 280 is inserted through the through-hole 312 of the wave generator 310. The bolt B2 is screwed in the screw hole for fixing 282 of the shaft 280 from the upward direction via the stop ring 370. Consequently, the wave generator 310 is assembled to the end portion 280a of the shaft 280.

This step is the wave generator attaching step.

The grease injecting step into the groove section 600 shown in FIG. 4C and the wave generator attaching step shown in FIG. 4D correspond to a grease filling step for filling the grease G in an internal space S.

The driving device 100 is completed by the assembling process explained above.

As shown in FIGS. 2, 3, and 4D, in a state in which the driving device 100 is completed, the internal space S is configured by the shaft 280, the wave generator 310 fixed to the shaft 280, the flex spline 330, the circular spline 360, the flange 220, the oil-seal fixing member 250, and the oil seal 500.

In this embodiment, as shown in FIG. 4C, the grease G is injected into the groove section 600 in the assembling. Therefore, the grease G is filled in the internal space S configured by finally fixing the wave generator 310 to the shaft 280.

In this embodiment, as shown in FIGS. 2, 3, and 4D, in a completed state of the driving device 100 in which the internal space S is filled with the grease G, concerning the center axis A direction of the shaft 280, the distance between the oil seal 500 and the wave generator 310 is set smaller than the distances among the other members.

Specifically, as shown in FIG. 3, the distance between the oil seal 500 and the wave generator 310 is set to a distance D1 between an end face 502 on the wave generator 310 side of the oil seal 500 and an end face 319 of the projecting section 318 of the wave generator 310. The distance D1 is set smaller than the distances among the other members, that is, a distance D2 between the wave-motion generating section 311 of the wave generator 310 and an end face 225a of the protrusion section for fixing 225 of the flange 220 and a distance D3 between the wave-motion generating section 311 of the wave generator 310 and an end face 222a of the deceleration-device supporting section 222 of the flange 220.

In the driving device 100 in this embodiment, as shown in FIG. 3, when the wave gear device 300 is located in the upward direction (vertically upward) on the paper surface with respect to the motor 200, when viewed from the perpendicular direction with respect to the center axis A in the cross section including the center axis A of the shaft 280, the internal space S filled with the grease G includes regions located further vertically downward than the oil seal 500 (further vertically downward than the end face 502 of the oil seal 500).

Specifically, as indicated by hatching in FIG. 3, in the internal space S filled with the grease G, a region C1 formed by the end face 502 of the oil seal 500 and the end face 225a of the protrusion section for fixing 225 and a region C2 formed by the end face 502 of the oil seal 500 and the end face 222a of the deceleration-device supporting section 222 are the regions located further vertically downward than the oil seal 500. The regions C1 and C2 are formed on the outer circumference side of the oil seal 500 in the radial direction.

When the wave gear device 300 is driven (rotated) by the driving of the motor 200, the external teeth of the flex spline 330 and the internal teeth of the circular spline 360 partially mesh with each other. The flex spline 330 and the circular spline 360 relatively rotate around the center axis A while a meshing position of the external teeth and the internal teeth sequentially moves in the circumferential direction. In this case, abrasion powder such as metal powder is sometimes caused because the external teeth and the internal teeth mesh with each other.

Such abrasion powder is affected by a centrifugal force due to rotation of the wave gear device 300 and easily circulates on the inner circumference side of the tubular section 331 of the flex spline 330 further on the outer circumference side than the oil seal 500. The abrasion powder easily moves vertically downward because the specific gravity of the abrasion powder is larger than the specific gravity of the grease G. As a result, in the internal space S filled with the grease G, the abrasion powder easily accumulates in the region C1 and the region C2, which are the regions located vertically downward further on the outer circumference side than the oil seal 500.

According to this embodiment, it is possible to obtain effects described below.

The driving device 100 in this embodiment includes the motor 200 and the wave gear device 300 including the wave generator 310 having the first thickness T1, the flex spline 330, and the circular spline 360 having the thickness T2 larger than the first thickness T1. The driving device 100 includes the at least one housing 210 functioning as the housing of the motor 200 and including the flange 220 for fixing a part (the fixing section 362) of the circular spline 360 and the oil seal 500 fixed to the inner side of the flange 220 and extending along the outer circumference of the shaft 280. When viewed from the perpendicular direction with respect to the center axis A in the cross section including the center axis A of the shaft 280, by setting the wave generator 310 close to the opposite direction of the flange 220, the internal space S is configured by the shaft 280, the wave generator 310 fixed to the shaft 280, the flex spline 330, the circular spline 360, the flange 220, and the oil seal 500. The internal space S is filled with the grease G and, then, concerning the center axis A direction of the shaft 280, the distance D1 between the oil seal 500 and the wave generator 310 is set smaller than the distances D2 and D3 among the other members.

With the driving device 100 integrated by being configured in this way, compared with when a motor and a wave gear device are separately assembled to an arm of the robot 10, it is possible to improve assemblability because the integrally configured driving device 100 only has to be directly assembled to the arm. It is necessary to inject the grease G halfway in the assembling when the motor and the wave gear device are separately assembled. However, since the driving device 100 is integrally configured, it is unnecessary to inject the grease G at the assembling time. It is possible to prevent a leak of the grease G at the assembling time.

In the driving device 100, the motor 200 and the wave gear device 300 are integrally configured. The thickness T2 of the circular spline 360 is set larger than the first thickness T1 of the wave generator 310. The wave generator 310 is set closer to the opposite direction of the flange 220 and the distance D1 between the oil seal 500 and the wave generator 310 is set smaller than the distances D2 and D3 among the other parts in the internal space S.

Consequently, the grease G filled in the internal space S is suppressed from flowing between the oil seal 500 and the wave generator 310. Therefore, it is possible to prevent the grease G from intruding into the inside of the motor 200 via the oil seal 500.

In the driving device 100, since the distance D1 between the oil seal 500 and the wave generator 310 is set smaller than the distances D2 and D3 among the other parts in the internal space S, the oil seal 500 is set closer to the wave generator 310. Therefore, it is possible to realize the driving device 100 small in size.

In the driving device 100 in this embodiment, excluding a member (the oil-seal fixing member 250) for fixing the oil seal 500 from the outer circumference side, at least one intervening member (the housing 210) including the flange 220 for fixing a part(the fixing section 362) of the circular spline 360 is configured by integral molding of aluminum.

With this configuration, since the housing 210 is integrally configured, assembling is easy compared with when the housing 210 is configured by a large number of members. It is possible to prevent intrusion of the grease G into the motor 200.

In the driving device 100 in this embodiment, when the wave gear device 300 is located vertically upward with respect to the motor 200, when viewed from the perpendicular direction with respect to the center axis A direction in the cross section including the axis (the center axis A) of the shaft 280, the internal space S filled with the grease G includes the regions C1 and C2 located further vertically downward than the oil seal 500.

With this configuration, when abrasion powder is caused by, for example, meshing of gears of the wave gear device 300, the abrasion powder can be accumulated in the regions C1 and C2 located further vertically downward than the oil seal 500. Accordingly, it is possible to prevent the grease G mixed with the abrasion powder from biting between the oil seal 500 (the lip surface 501) and the shaft 280 (the outer circumferential surface 281). Therefore, it is possible to realize the driving device 100 with improved reliability.

The assembling method for the driving device 100 in this embodiment includes a step of filling the grease G in the internal space S in the internal space S configured by the shaft 280, the wave gear device 300, the flange 220, and the oil seal 500 halfway in the assembling step for assembling the motor 200, the wave gear device 300, the housing 210 including the flange 220, and the oil seal 500. After the end of the assembling step, in the internal space S, the distance D1 between the oil seal 500 and the wave generator 310 is smaller than the distances D2 and D3 among the other members in the center axis A direction of the shaft 280.

With the assembling method, in the driving device 100, the motor 200 and the wave gear device 300 is integrally configured and the distance D1 between the oil seal 500 and the wave generator 310 is set smaller than the distances D2 and D3 among the other members. Consequently, the grease G filled in the internal space S is suppressed from flowing to between the oil seal 500 and the wave generator 310. Therefore, it is possible to prevent the grease G from intruding into the inside of the motor 200 via the oil seal 500.

Compared with when a motor and a wave gear device are separately assembled to an arm of the robot 10, it is possible to improve assemblability because the integrally configured driving device 100 only has to be directly assembled to the arm. It is necessary to inject the grease G halfway in the assembling when the motor and the wave gear device are separately assembled. However, since the driving device 100 is integrally configured, it is unnecessary to inject the grease G at the assembling time. It is possible to prevent a leak of the grease G at the assembling time.

2. Modification 1

In the driving device 100 in this embodiment, the oil-seal fixing member 250 and the housing 210 are separately configured. However, not only this, but the oil-seal fixing member 250 and the housing 210 may be integrally molded.

3. Modification 2

In the driving device 100 in this embodiment, the internal space S is filled with the grease G. However, not only this, but 50% or more of the internal space S may be filled with the grease G.

4. Modification 3

The driving device 100 in this embodiment is explained as being used as the driving device of the vertical articulated robot. However, not only this, but the driving device 100 may be used as a driving device of a horizontal articulated robot.

5. Modification 4

In the driving device 100 in this modification, one housing 210 functions as the housing of the motor 200 and fixes a part of the circular spline 360. However, not only this, but a separately provided housing may function as the housing of the motor 200 and fix a part of the circular spline 360.

What is claimed is:

1. A driving device comprising:
   a motor including a shaft;
   a wave gear device including a wave generator having first thickness in an axial direction of the shaft, a flex spline configured to be flexurally deformed along an outer circumference of the wave generator, and a circular spline configured to interlock with rotation of the wave generator via the flex spline and having thickness larger than the first thickness in the axial direction of the shaft;
   at least one intervening member functioning as a housing of the motor and including a flange for fixing a part of the circular spline; and
   an oil seal fixed to an inner side of the flange and extending along an outer circumference of the shaft, wherein
   when viewed from a perpendicular direction with respect to an axis of the shaft in a cross section including the axis, the wave generator is set closer to an opposite direction of the flange to configure an internal space with the shaft, the wave generator fixed to the shaft, the flex spline, the circular spline, the flange, and the oil seal, and
   the internal space is filled with grease and, then, a distance between the oil seal and the wave generator is set smaller than distances among other members in the axial direction of the shaft.

2. The driving device according to claim 1, wherein, excluding a member for fixing the oil seal from an outer circumference side, the intervening member is configured by integral molding of aluminum.

3. The driving device according to claim 1, wherein, when the wave gear device is located vertically upward with respect to the motor, when viewed from a perpendicular direction with respect to the axial direction in a cross section including the axis of the shaft, the internal space filled with the grease includes a region located further vertically downward than the oil seal.

4. An assembling method for a driving device includes, halfway in an assembling step for assembling a motor including a shaft, a wave gear device including a wave generator, at least one intervening member functioning as a housing of the motor and including a flange for fixing a part of the wave gear device, and an oil seal extending along an outer circumference of the shaft, filling grease in an internal space configured by the shaft, the wave gear device, the flange, and the oil seal, wherein     after an end of the assembling step, in the internal space, a distance between the oil seal and the wave generator is smaller than distances among the other members in an axial direction of the shaft.

\* \* \* \* \*